Figure 1:
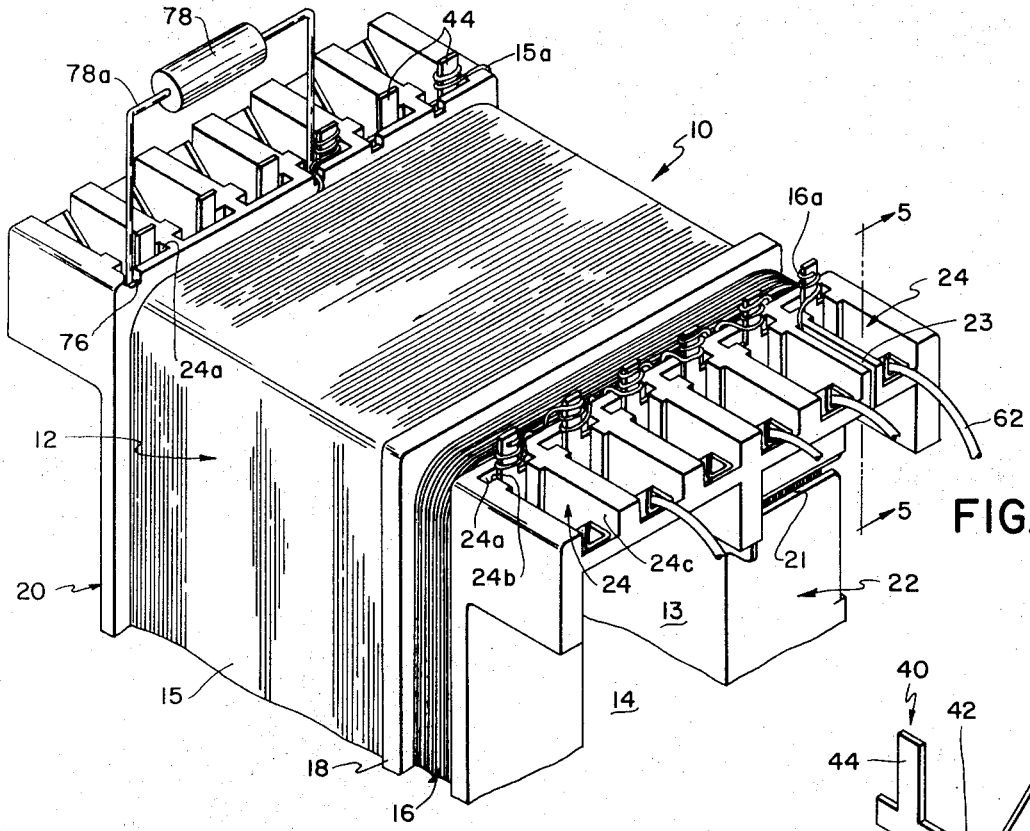
Figure 2:
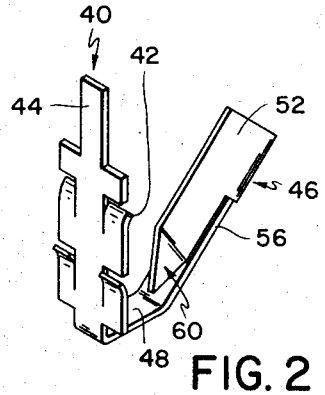
Figure 4:
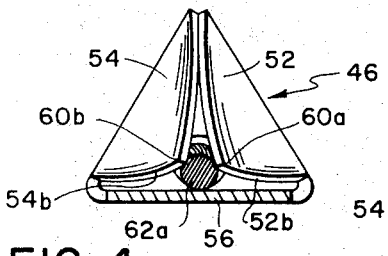
Figure 2A:
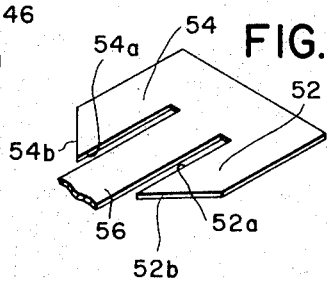
Figure 3:
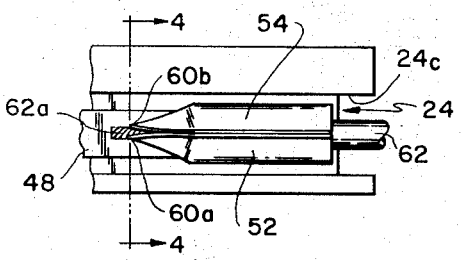
Figure 5:
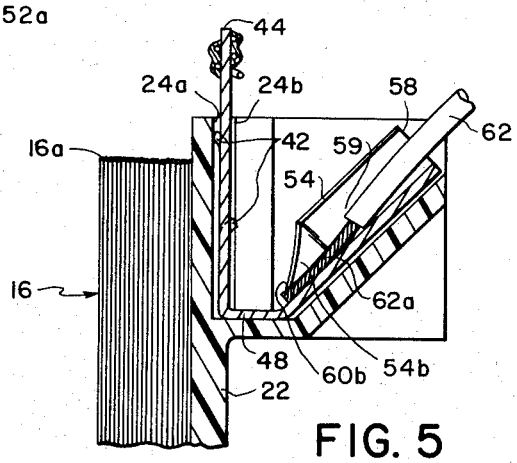

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 8

T920,007
BOBBIN ASSEMBLY

Edward J. Cator, Country Road 36,
Naples, N.Y. 14512

Filed Apr. 20, 1973, Ser. No. 353,142
Int. Cl. H02h *7/04;* H01f *15/10, 27/30*
U.S. Cl. 317—15
1 Sheet Drawing. 10 Pages Specification

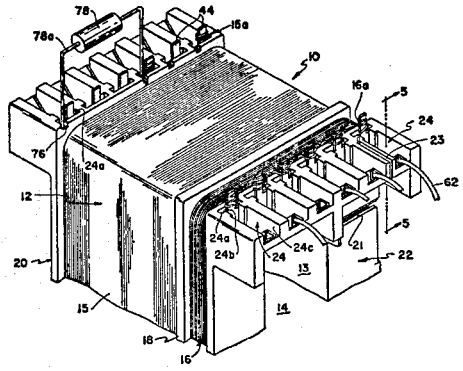

A coil bobbin of unitary body construction having a core for winding insulated primary and secondary coil wire between oppositely opposed flanges at each end of the core. The flanges are adapted to receive terminal lugs on a periphery thereof for terminating the wound coil wire and lead-in or lead-out wires. The terminal lugs are electrically conductive and are anchored adjacent the core and laterally spaced along the flange to provide ready automated winding of primary or secondary coils. A terminal lug includes a tang for terminating coil wire and a terminal having a body for receiving a lead wire. The body includes a flexible projection partially blocking passage of an inserted lead wire through the body, located at an acute angle to an axis through the body and being engageable by a lead wire inserted into the body. The flexure of the projection permits the lead wire to be inserted into the body beyond the projection so that the angle and flexure of the projection releasably retains the lead wire in an electrical connection with the terminal lug.

BOBBIN ASSEMBLY

Filed April 20, 1973